US006480352B1

(12) United States Patent
Okada et al.

(10) Patent No.: US 6,480,352 B1
(45) Date of Patent: Nov. 12, 2002

(54) DRIVE SYSTEM EQUIPPED WITH AN AUTOLOADER MECHANISM, AND AUTOLOADING DEVICE

(75) Inventors: Tomoyuki Okada; Yuji Kato; Hirofumi Saito; Takahisa Miyamoto, all of Inagi; Akira Takano, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/533,539

(22) Filed: Mar. 23, 2000

(30) Foreign Application Priority Data

Aug. 4, 1999 (JP) ............................ 11-221344

(51) Int. Cl.[7] ..................... G11B 15/68; G11B 17/04
(52) U.S. Cl. ...................... 360/92; 360/99.06
(58) Field of Search ................ 360/99.06, 90, 360/91, 92, 98.04, 98.06; 369/30, 36, 38, 178, 191, 204, 30.42, 30.43, 30.53, 30.55, 30.68, 30.7, 30.83, 30.85

(56) References Cited

U.S. PATENT DOCUMENTS

| 5,231,552 A | * | 7/1993 | Schneider et al. ............. 211/40 |
| 5,337,297 A | * | 8/1994 | Kvifte et al. .................. 360/92 |
| 5,659,440 A | * | 8/1997 | Acosta et al. ................. 294/168 |
| 5,907,531 A | * | 5/1999 | Fujita et al. ............. 369/30.77 |
| 6,115,207 A | * | 9/2000 | d'Alayer de Costemore d'Arc et al. ............................... 360/92 |

* cited by examiner

*Primary Examiner*—Hoa T. Nguyen
*Assistant Examiner*—Julie Anne Watko
(74) *Attorney, Agent, or Firm*—Greer, Burns & Crain, Ltd.

(57) ABSTRACT

In order to achieve a drive system having a simple structure in which a cartridge having therein a wound magnetic tape can be supplied or replaced in small installation space, a carrier unit structure is employed in which a cartridge is horizontally retracted from a magazine capable of horizontally inserting/removing the cartridge and then held therein. Further, a drive unit is located beneath the carrier unit, and the cartridge held in the carrier unit is released so that the cartridge can be dropped and loaded into the drive unit.

4 Claims, 3 Drawing Sheets

DRIVE SYSTEM EQUIPPED WITH AN AUTOLOADER MECHANISM, AND AUTOLOADING DEVICE

BACKGROUND OF THE INVENTION

1. Field of the Invention

The present invention is effectively applied to a technique for loading a cartridge, particularly a magnetic tape cartridge, into a drive unit. More specifically, the present invention relates to a drive system equipped with an autoloader mechanism, and an autoloading device.

2. Description of the Related Art

In this type of technique for loading a cartridge into a drive unit known is a cartridge autoloading device having a mechanism in which a unit capable of accommodating a plurality of cartridges is provided at an insertion/ejection port side of a general-purpose drive unit so that these cartridges may be selectively loaded into the drive unit.

FIG. 2 is an example of system overview of a typical cartridge autoloading device.

In this figure, reference numeral 21 denotes a drive unit where data in a cartridge 22 mounted therein can be read and written under a control from a host device.

An autoloading device 24 includes a magazine 25 capable of accommodating the cartridge in tiers. While a carrier unit 26 is guided by a guide rail 27 to move up and down in the autoloading device, it can selectively remove the cartridge 22 from the magazine 25 and accommodate it therein. In other words, the carrier unit 26 serves to selectively load the cartridge 22 into the drive unit 21 from the magazine 25 and return the cartridge 22 ejected from the drive unit 21 to the magazine 25.

In this arrangement, for replacement of the cartridge 22 in the drive unit 21, the carrier unit 26 in a standby mode at an insertion/ejection port 21a of the drive unit 21 receives the cartridge horizontally ejected from the drive unit 21, and the carrier unit 26 elevates and lowers up to a predetermined position in height where the cartridge 22 is returned to a certain empty tier of the magazine 25 positioned at the side opposite to the drive unit 21.

Also, when a new cartridge is loaded into the drive unit 21, the carrier unit 26 receives the cartridge 22 from the magazine 25, and elevates/lowers to the position at the insertion/ejection port 21a of the drive unit 21 where the cartridge 22 held by the carrier unit 26 is then ejected to the drive unit 21 side to thereby load the cartridge into the drive unit 21.

Therefore, in both cases of returning and loading the cartridge 22, a series of the following operations must be repeated: horizontally retracting/advancing the cartridge, elevating/lowering the carrier unit, and then horizontally retracting/advancing the cartridge again. This involves complicated steps, making the structures of the carrier unit 26 and the drive unit 21 complicated, and requires sufficient space to install the entire system.

The present invention has been made in view of the above-stated problems, and its technical object is to achieve a drive system having a simple structure in which a cartridge can be supplied or replaced in small installation space.

SUMMARY OF THE INVENTION

In order to solve the foregoing technical problems, according to the present invention, a drive unit is positioned beneath a cartridge autoloading device so that the number of steps for conveying a cartridge between a magazine and the drive unit may be reduced.

More specifically, a carrier unit structure is employed in which a cartridge is horizontally retracted from a magazine capable of horizontally inserting/removing the cartridge and then held therein. Further, a drive unit is located beneath the carrier unit, and the cartridge held in the carrier unit is released so that the cartridge can be dropped and loaded into the drive unit.

Further, the magazine itself is rotated about the pivot portion and falls down to the outside of the drive unit to expose a cartridge receiving section to the external. This allows the magazine or the cartridge received within the magazine to be easily replaced.

DETAILED DESCRIPTION OF THE PREFERRED EMBODIMENT

The preferred embodiment of the present intention will now be described with reference to the accompanying drawings.

Figure 1:
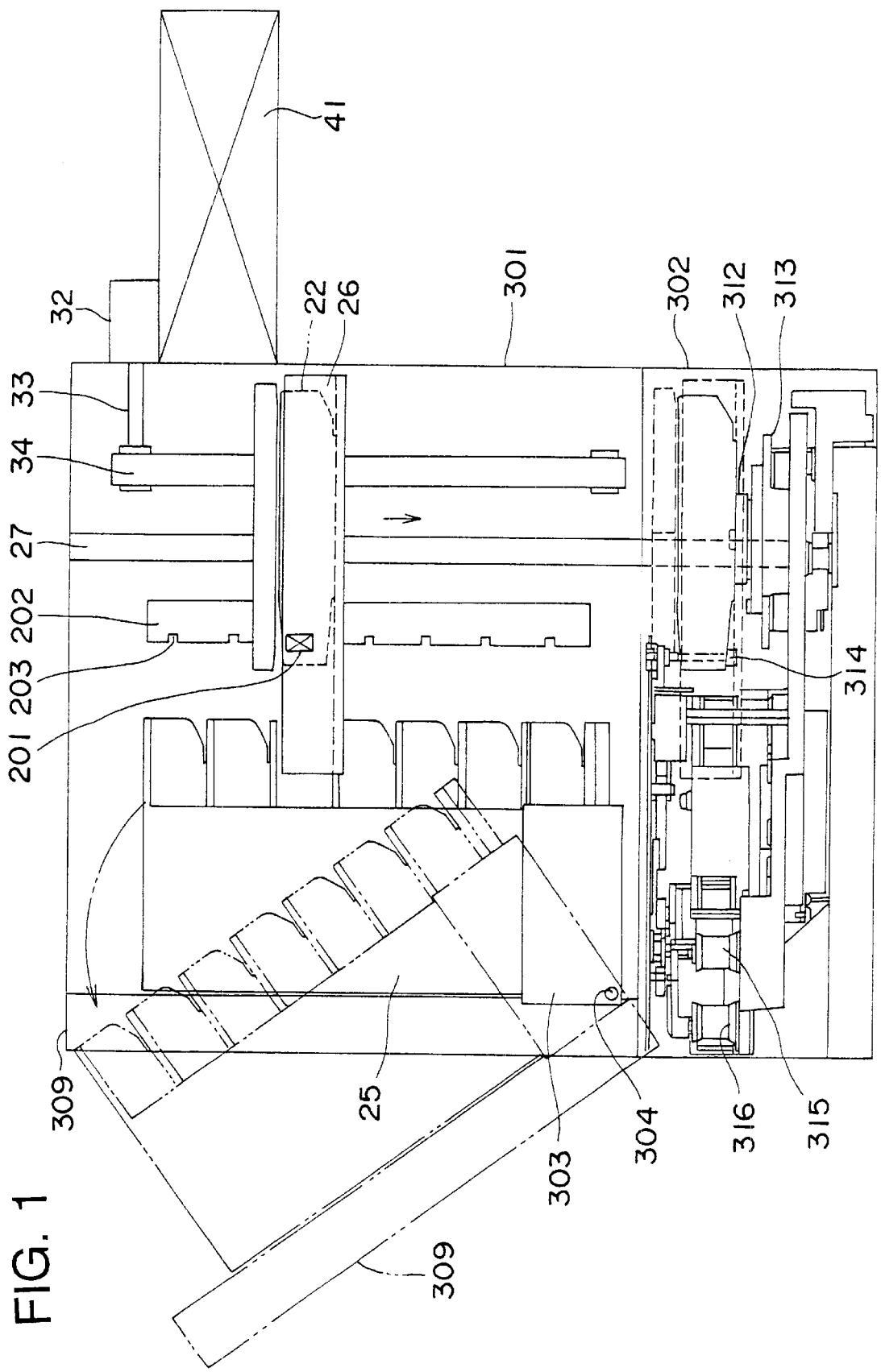
FIG. 1 is a diagram for explaining a drive system in accordance with an embodiment of the present invention.
Figure 2:
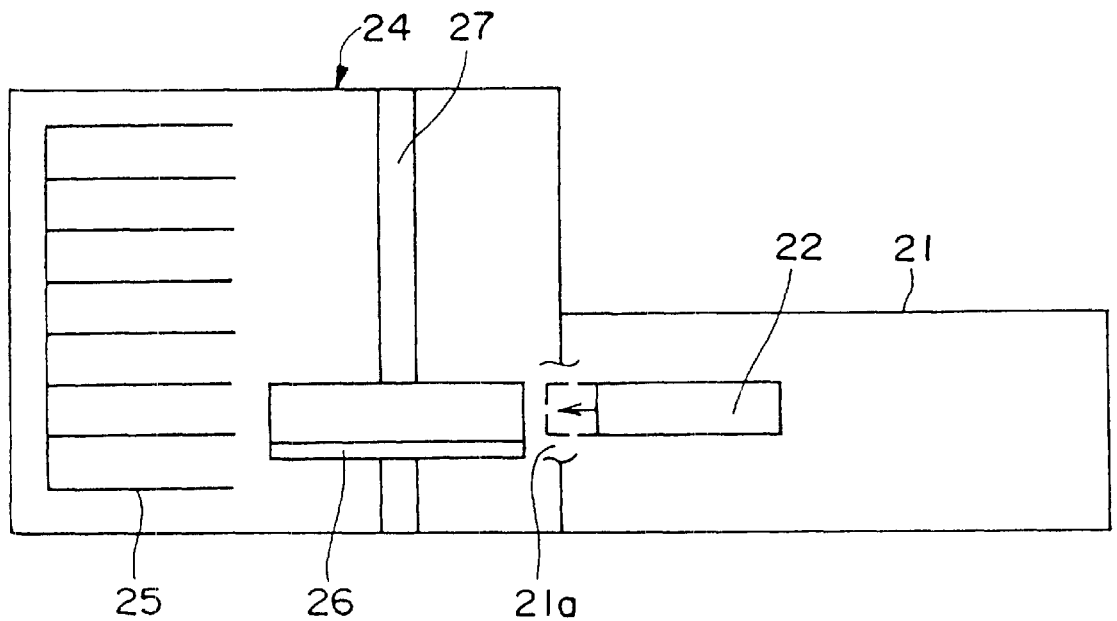
FIG. 2 is an explanatory diagram showing a positional relation between an autoloading device and a drive unit in the prior art.

Referring now to FIG. 1, an autoloader system in accordance with the present embodiment is made up of an autoloading device 301 positioned at an upper portion and a drive unit 302 positioned at a lower portion.

The autoloading device 301 includes a magazine 25 capable of accommodating a cartridge 22 in seven tiers which is maintained in a magazine tray 303, and an pivot portion 304 in the vicinity of the bottom of the magazine tray 303. The magazine 25 is integrated with an opening/closing door 309 so that the opening/closing door 309 is rotated counterclockwise about the pivot portion 304 to open the opening/closing door 309 whereby the cartridge 22 received in the magazine 25 and the cartridge receiving section therefor may be exposed to the external. Under this condition, both the magazine 25 and the cartridge 22 can be replaced.

In the autoloading device 302, a carrier unit 26 is located at a side of the magazine 25, which is guided by a guide rail 27 so that the it may be elevated/lowered. The carrier unit 26 is fixed to a portion of an elevation/lowering belt 34 juxtaposed with the guide rail 27, and is operable to elevate/lower as the elevating/lowering belt 34 rotates. The elevation/lowering belt 34 is suspended from a distal end of a driving shaft 33. Thus, as an elevation/lowering motor 32 is rotated, the carrier unit 26 may be elevated/lowered. An applied voltage to the elevation/lowering motor 32 is controlled by a control unit 41.

A detection flag plate 202 is disposed between the guide rail 27 and the magazine 25. Cutaway portions 203 are formed in a side of the detection flag plate 202 at a predetermined interval, and are detected by an optical sensor 201 of the carrier unit 26 to thereby control a position of the carrier unit 26 in height relative to the magazine 25.

Figure 3:
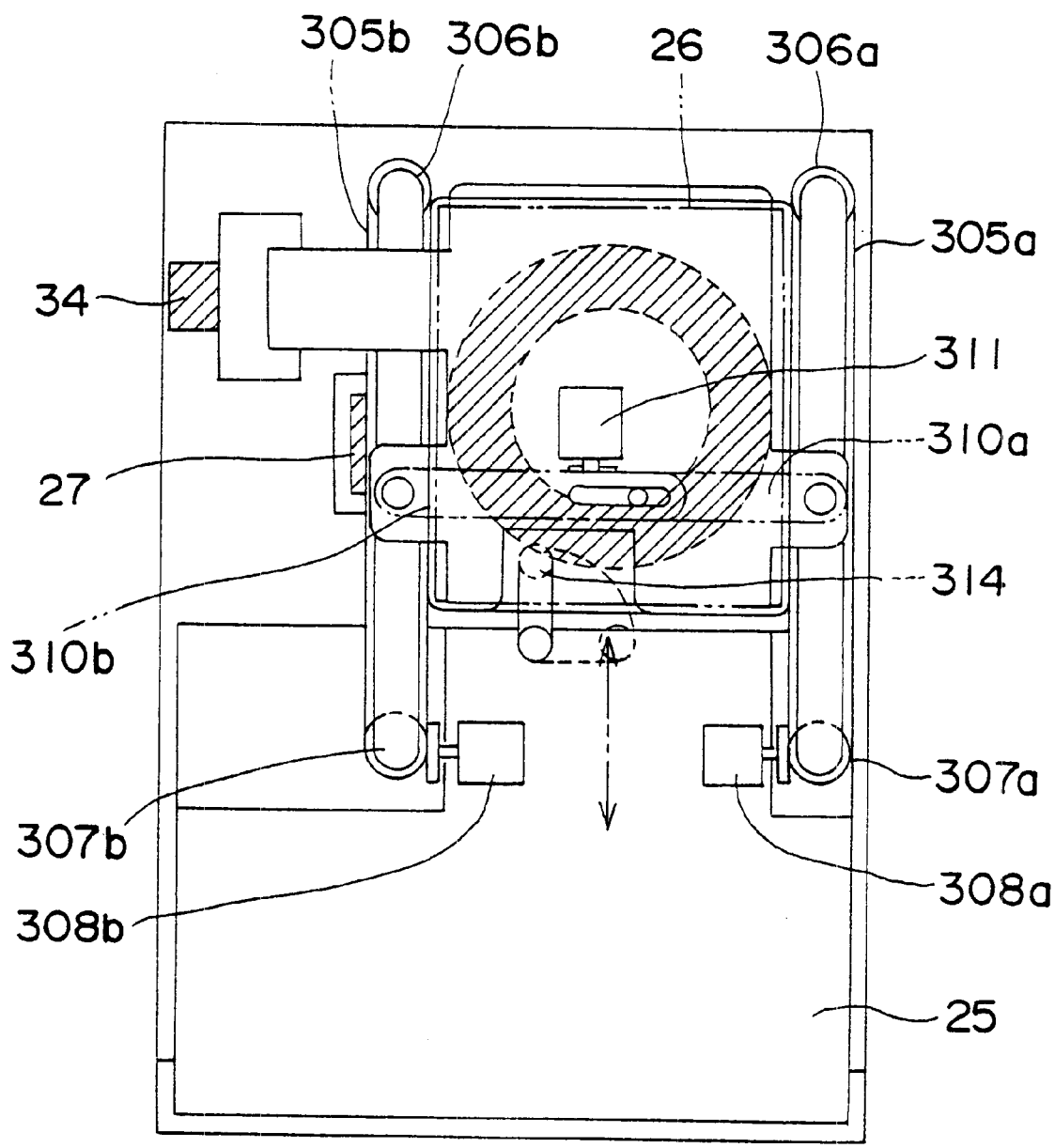
FIG. 3 is a plan view showing the structure of a carrier unit in accordance with the embodiment of the present invention.

FIG. 3 shows the structure of the carrier unit 26 in more detail. In this figure, a holding belt 305a is suspended by a pair of guide rollers 306a and 307a, and the guide roller 307a is given a rotational force by a holding belt motor 308a to rotate the holding belt 305a. Also, at a position opposite thereto, a holding belt 305b is suspended by a pair of guide rollers 306b and 307b, and the guide roller 307b is given a rotational force by a holding belt motor 308b to rotate the holding belt 305b.

As the holding belt motors 308a and 308b are rotated, the holding belts 305a and 305b retract (feed upward in FIG. 3) the cartridge 22 into the carrier unit 26 while the cartridge 22 is held therebetween. The inverse rotation of the holding belt motors 308a and 308b will allow the cartridge 22 held therebetween to be ejected toward the magazine 25.

The holding belts 305a and 305b are maintained at a certain interval in position by clamping arms 310a and 310b, and the clamping arms 310a and 310b are moved so as to approach to or be apart from each other by a clamping motor 311. In other words, the clamping motor 311 is operable so that the holding belts 305a and 305b may approach to or be apart from each other. When the holding belts 305a and 305b are moved to approach to each other, the cartridge 22 is held therebetween with a biasing force. When the holding belts 305a and 305b are moved to be apart from each other, the cartridge 22 held between these holding belts is released.

The drive unit 302 is located therebeneath, and the location which the cartridge 22 is to be loaded into is positioned exactly under the carrier unit 26, including a clutch mechanism 312 at the bottom of this location. The clutch mechanism 312 can be lifted up and down, under which a drive motor 313 is disposed. The clutch mechanism 312 is appropriately engaged with a reel (not shown) disposed on the bottom surface of the cartridge 22 to rotate the reel so that a magnetic tape wound around the reel may be fed or rewound.

The drive unit 302 includes a movable guide pin 314, and the guide pin 314 allows the magnetic tape in the cartridge 22 to be removed from the cartridge 22. The removed magnetic tape is guided by a plurality of guide rollers 315, 316 to be brought into contact with a magnetic head (not shown), where the data can be read and written.

Now, the procedure of loading into the drive unit 302 the cartridge 22 from the magazine 25 with the above-states arrangement will be described.

First, the control unit 41 actuates the elevation/lowering motor 32 to stop the carrier unit 26 at a predetermined tier of the magazine 25. At this time, the control unit 41 enters (counts) a detection signal of the optical sensor 201 and identifies the position of the magazine 25 in height (the number of ties).

Then, the control unit 41 actuates the holding belt motors 308a and 308b to rotate the holding belts 305a and 305b so that a certain cartridge 22 is retracted to the carrier unit 26 side from the magazine 25. Accordingly, the cartridge 22 is held between the holding belts 305a and 305b and maintained in the carrier unit 26.

The control unit 41 then actuates the elevation/lowering motor 32 again to lower the carrier unit 26 up to the lowermost of the guide rail 27, i.e., up to the position in contact with the drive unit 302.

Under this condition, the control unit 41 actuates the clamping motor 311 to move the clamping arms 310a and 310b so as to be apart from each other. This makes the holding belts 305a and 305b open relative to each other while the cartridge 22 held therebetween is released from the holding state to be dropped into the drive unit 302 and loaded.

For the cartridge 22 mounted in the drive unit 302, the clutch mechanism 312 is in contact with a reel (not shown) in the cartridge 22, and a magnetic tape (not shown) wound on the reel is drawn by the guide pin 314. The magnetic tape is passed through the guide rollers 315 and 316 and brought into contact with a magnetic head (not shown), where data can be read from and written into the magnetic tape.

After the data processing of the cartridge 22 has been performed at the drive unit 302 in this way, the clutch mechanism 312 urges the cartridge 22 to be pushed up toward the drive unit 302. At this time, the carrier unit 26 in a standby mode at the position in contact with the drive unit 302 operates the clamping motor 311 so that the holding belts 305a an d 305b clamp therebetween the pushed cartridge 22.

Under a control of the control unit 41, the carrier unit 26 elevates up to a predetermined position in height, i.e., the tier position of the magazine 25 where the cartridge 22 is to be returned while holding the cartridge 22.

The control unit 41 then operates the holding belt motors 308a and 308b to eject the held cartridge 22 to the magazine 25 side.

As described above, according to the present embodiment, the cartridge 22 can be fed and loaded into the drive unit 302 from the magazine 25 through the following three steps of: (1) retracting the cartridge 22 from the magazine 25, (2) lowering the carrier unit 26, and (3) releasing the cartridge 22. In particular, the releasing step (3) can be handled in a short time. Therefore, the cartridge 22 can be extremely efficiently loaded into the drive unit as compared to the prior art in which the cartridge 22 in the carrier unit is horizontally fed and loaded into the drive unit.

With this structure according to the present embodiment, since the drive unit 302 is disposed beneath the autoloading device 301, the installation area required for the entire system can be reduced.

What is claimed is:

1. A drive system comprising:
   an autoloader mechanism including:
      a magazine capable of accommodating in stacked tiers a cartridge to be conveyed, and of horizontally inserting and removing the cartridge, and
      a carrier unit capable of vertically elevating/lowering, said carrier unit having holder means for holding the cartridge horizontally inserted from said magazine into said carrier unit, the holder means lowering with said carrier unit, releasing and dropping the cartridge; and
   a drive unit disposed beneath said carrier unit, the drive unit including:
      a cartridge loaded section for accommodating the cartridge released and dropped from the holder means, the cartridge is loaded on said cartridge loaded section, and
      a drive section for retrieving a recording medium from the loaded cartridge to read and write data from and into the recording medium.

2. A drive system, as claimed in claim 1, wherein the holder means of said carrier unit is a pair of openable belts, the belts being rotated to insert/eject the cartridge, the belts holding the cartridge therebetween with a biasing force, the belts being made open to release and drop the cartridge.

3. An autoloading device comprising:
   a magazine capable of accommodating in stacked tiers a cartridge to be conveyed, and of horizontally inserting and removing the cartridge; and a carrier unit capable of vertically elevating/lowering, said carrier unit having holder means for holding the cartridge horizontally inserted from said magazine into said carrier unit, the holder means lowering with said carrier unit, releasing and dropping the cartridge.

4. An autoloading device as claimed in claim 3, wherein said magazine is pivoted with a pivot part at a lower end of itself opposite to said carrier unit, said magazine being fallen down about the pivot part in the direction opposite to said carrier unit to expose an cartridge accommodating section to the external so that the cartridge accommodating in said magazine can be replaced.

* * * * *